Figure 2:
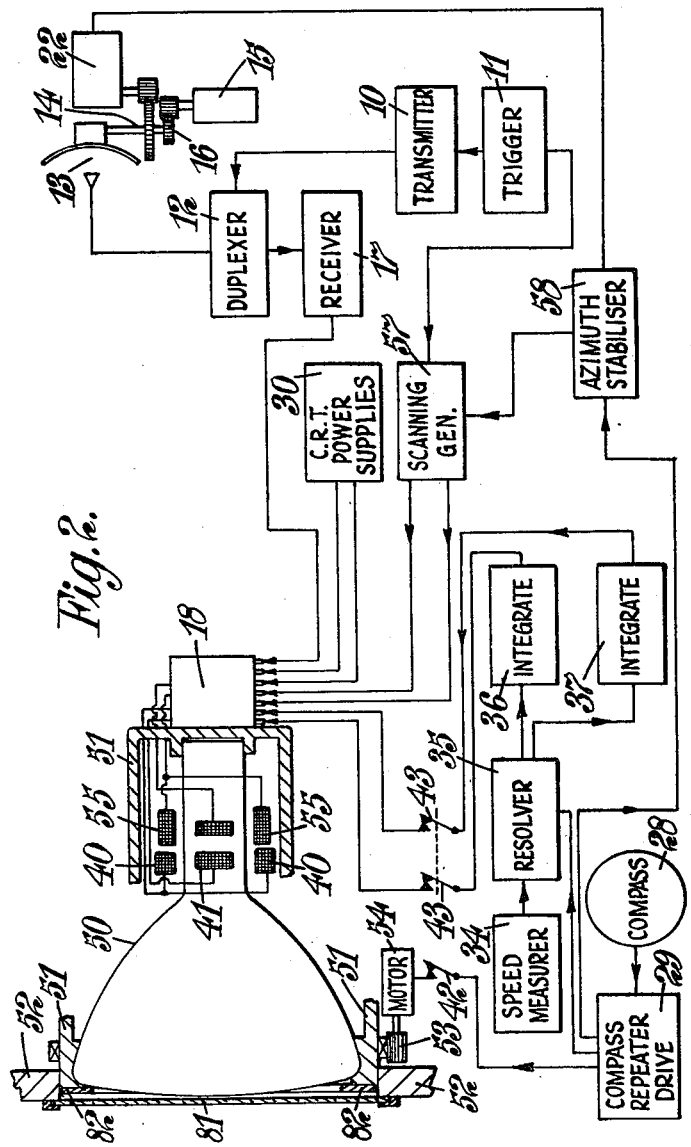

Oct. 31, 1961  R. E. G. SIMMONS ET AL  3,007,152
RADAR DISPLAY APPARATUS
Filed July 9, 1956  4 Sheets-Sheet 1

Fig.1.

Oct. 31, 1961   R. E. G. SIMMONS ET AL   3,007,152
RADAR DISPLAY APPARATUS
Filed July 9, 1956   4 Sheets-Sheet 2

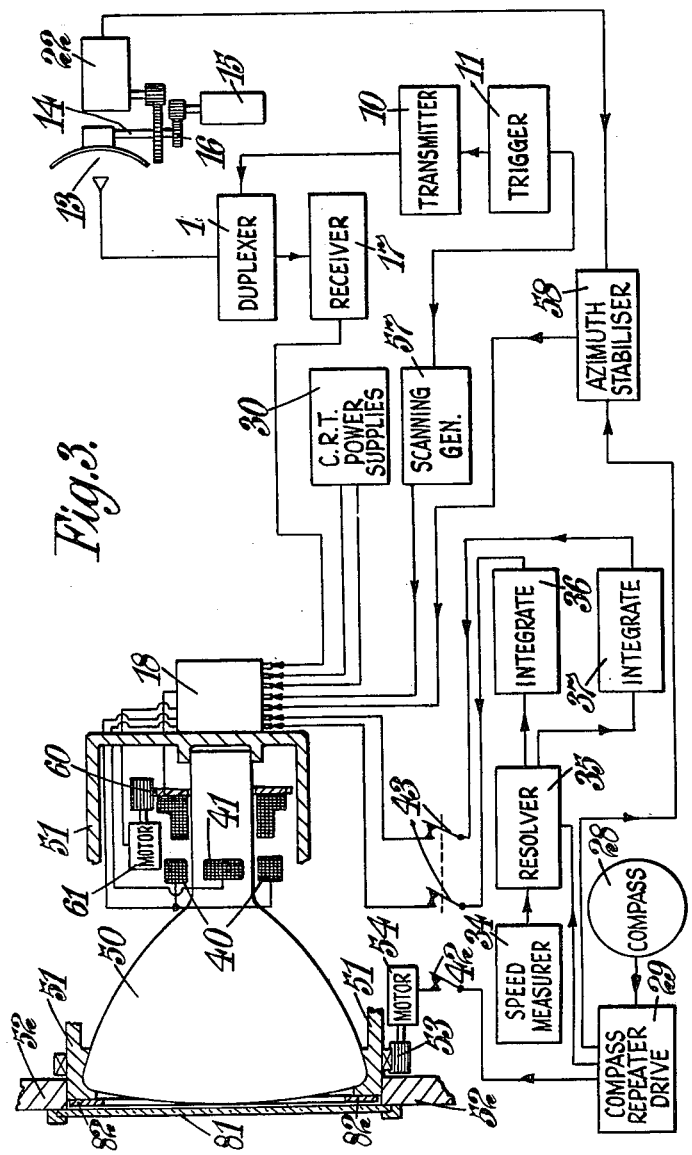

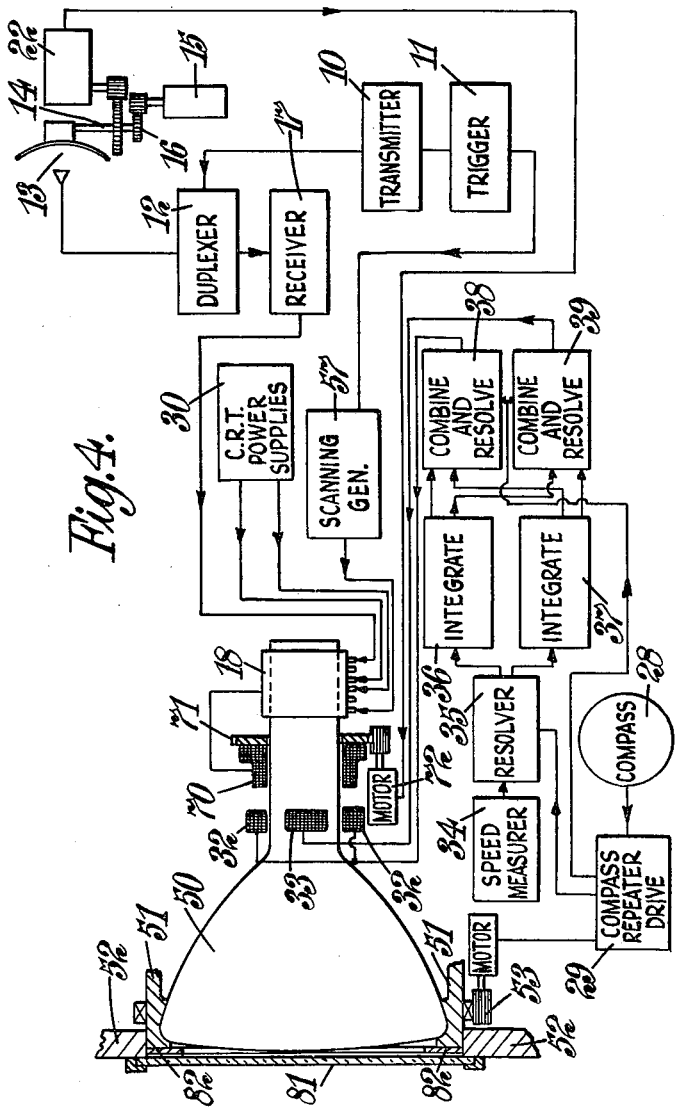

United States Patent Office 3,007,152
Patented Oct. 31, 1961

3,007,152
RADAR DISPLAY APPARATUS
Ronald Eric George Simmons, Hubert Louis Arnold Foy, Jack Denny Shepherd, and Maurice Henry Easy, London, England, assignors to The Decca Record Company Limited, London, England, a British company
Filed July 9, 1956, Ser. No. 596,665
20 Claims. (Cl. 343—5)

This invention relates to plan position indicators for use on vehicles, e.g. on ships or aircraft, for displaying radar information.

At the present time, there are two methods generally employed for displaying radar plan position information in radar displays for ships. In one of these methods (referred to hereinafter as a relative display) the direction corresponding to the ship's heading is kept in a fixed direction on the screen of hte tube, usually upwards, so that all the echoes are displayed on their relative bearings from the ship's head. In the other method (the compass datum stabilised display), the display is stabilised with respect to a compass datum so that a datum direction, usually North, extends upwardly on the screen. A compass datum stabilised display has a number of advantages. In particular, there is no apparent change in bearing of echoes as the ship yaws and no smudging of the echoes occurs when the ship alters course or yaws. Furthermore, this form of display is particularly convenient for comparison with a chart when piloting a ship close to land. However, in the majority of merchant ships, it is preferred to use relative display in which echoes are displayed on bearings relative to the ship's heading since the appearance on the screen is more closely related to the information to which an observer looking out on the ship is accustomed despite the disadvantage that, in considering whether the ship is on a course which might collide with another ship, note has to be taken as to whether the true bearing of one ship relative to the other changes and the relative display tends to confuse the observer in this respect since it shows only the relative bearing from the ship's heading and this is constantly changing unless the ship maintains an exactly steady course.

This present invention relates more particularly to relative displays. It has been proposed to provide a radar plan position indicator having a relative display on a cathode ray tube screen in which the cathode ray tube is rotated in accordance with changes in the heading of the vehicle, the rotation being in the direction to compensate for changes in the relative bearings of the radar targets so that echoes of targets tend to remain in the same position on the actual screen of the tube. This arrangement helps to prevent any smudging of the echoes occurring when the vehicle alters course or yaws, which is of particular advantage for ships navigating in narrow waters where the ship has to change course frequently. However, this arrangement in itself is not sufficient to prevent all smudging of echoes and, in particular, echoes from fixed objects, such as buoys observed from a ship will still be smudged due to the movement of the ship. It is an object of the present invention to provide an improved form of radar plan position indicator in which smudging of echoes from fixed objects is reduced or eliminated.

According to this invention a radar plan position indicator for use on a vehicle and arranged to provide a relative display on a cathode ray tube screen, the tube being rotated in accordance with changes in the heading of the vehicle to compensate for changes in the relative bearings of the radar targets so that echoes of targets tend to remain in the same angular position on the actual screen of the tube is characterised in that means are provided for off-centering the display on the screen at a rate and in a direction corresponding to the rate and direction of movement of the vehicle. Such use of an off-centering system in conjunction with the rotation of the cathode ray tube ensures that echoes of fixed targets on the screen remain stationary on the screen of the tube. This prevents any smudging of echoes from fixed objects and hence facilitates the discrimination between and hence the identification of fixed and moving objects. Furthermore, if an echo is known to be received from a fixed object, the rate of off-centering may be adjusted to ensure that there is no smudging and the actual speed of the vehicle may be obtained by suitable calibration of the control for the rate of off-centering.

The rotation of the cathode ray tube may be controlled by a compass. Since the tube rotation corresponds exactly with the changes in vehicle's heading, the surface of the tube can be regarded as a compass card and, if desired, a compass scale and/or other equivalent markings may be put on it.

The means for off-centering the beam of the cathode ray tube may be maintained stationary whilst the tube is rotated or, alternatively, may be rotated with the tube. In one arrangement, the aforementioned means for off-centering the display comprises fixed deflector coils and means for feeding, to the coils, off-centering control currents varying at rates according to the changes in the cumulative movement of the vehicle. The tube would then be rotated between the coils.

As explained below, there are, however, certain advantages if the cathode ray beam deflector means for off-centering the beam are rotated with the tube. It will be appreciated that this would be necessary in any case if electrostatic deflection was employed using deflector plates inside the tube. More generally, however, in radar apparatus at the present day, electro-magnetic deflection is employed with coils external to the tube but these coils may be rotated with the tube if the deflector means are to be rotated. In one arrangement of radar plan position indicator having beam deflector means, such as for example deflection coils, for effecting the scanning deflection of the beam of the cathode ray tube, which are mounted so as to be rotated with the cathode ray tube, the means for off-centering the display may comprise an off-centering coil system arranged to be rotated in accordance with changes in the heading of the vehicle and means for feeding, to the off-centering coil system, off-centering control currents varying at rates adjustable according to changes in the cumulative movement of the vehicle. Conveniently this off-centering coil system is mechanically coupled to the cathode ray tube to be rotated with the tube.

Manual adjusting means may be provided for adjusting the rates of change and the ratio of the rates of change of said currents according to the speed and direction of movement of the vehicle and such arrangement may be completely satisfactory if it is only required to stabilise the display whilst the vehicle is on a constant course. Preferably however automatic means controlled by a speed measuring device and a compass are provided for adjusting the currents in accordance with the cumulative changes in the speed and direction of movement of the vehicle determined by said speed measuring device and said compass.

In any of the above arrangements, the cathode ray beam deflector means for effecting the scanning deflection of the beam may be either fixed that is to say mounted independently of the tube so as not to be rotated therewith or they may be mounted so as to be rotated with the cathode ray tube. In the former case, the scanning deflection may be controlled, in direction of scan, simply by a bearing data transmitter in accordance with the relative bearing of the antenna with respect to the vehicle. In the latter case, however, the beam deflector means must be fed with signals representative both of the compass bearing of the heading of the vehicle and of the relative bearing of the radar antenna with respect to the vehicle. The rotatable deflector means might comprise a deflection coil assembly mounted in a coil housing which housing is arranged to be rotatable with the tube. This deflection coil assembly may comprise deflection coils fixedly mounted in the coil housing for rotation around the neck of a cathode ray tube in synchronism with the required scan of the beam or it may comprise a deflection coil or coils rotatably mounted in said housing for rotation around the neck of the cathode ray tube and a motor mounted in said housing and controlled by a combined signal from a compass and from an antenna bearing transmitter for rotating the deflection coil or coils in synchronism with the required scanning of the beam. The advantages of rotating the deflector means with the tube arise from the fact that in this arrangement if the tube and deflector means were, for any reason, not rotated, then these combined signals applied to the deflector means would produce a compass datum stabilised display and hence, by merely switching off the tube rotating means, this form of display can be simply changed to a compass datum stabilised display. If switch means are provided for preventing off-centering deflection of the beam when desired, the display may thus readily be made into a conventional relative display (i.e. by switching off the off-centering but keeping the tube rotating in accordance with changes in the heading) or into a conventional azimuth stabilized with fixed origin (i.e. by switching off the off-centering and the tube rotation).

In general any of the above-described methods of off-centering the display may be used with any method of scanning the cathode ray beam. In some cases, it may be preferred to combine the off-centering and scanning signals so that only a single set of deflector means need be used and this may be done, for example, in the manner described in British patent specification No. 737,519.

Sometimes it is desired to have a transparent plotting surface over the face of the cathode ray tube. Such a plotting surface may be rotatably mounted about the axis of the tube. The plotting surface may be driven to rotate automatically in synchronism with the rotation of the tube. However it may be undesirable to have a moving surface for plotting and preferably therefore such a plotting surface is made manually rotatable and, in this latter case, may be provided with a fixed mark, e.g. a North mark, so that it can be rotated manually to be in line with a corresponding mark on the cathode ray tube.

Since fixed echoes remain at fixed positions on the screen, the plotting surface may, in some cases such as for example when the vehicle only operates in a limited area, conveniently be a chart transparency.

The following is a description of a number of embodiments of the invention, reference being made to the accompanying drawings in which each of FIGURES 1, 2, 3 and 4 are diagrammatic representations of pulse radar systems for use on a ship.

Referring to FIGURE 1, there is shown a radar system having a pulse transmitter 10 for producing radio frequency pulses in synchronism with the application of trigger pulses from a trigger pulse generator 11. The radio frequency pulses are fed through a duplexer 12 to a directional antenna 13 which is mounted on a shaft 14 for continuous rotation and is driven by a motor 15 through gearing 16. Echo signals received by the antenna 13 after passing through the duplexer 12 are fed to a receiver 17. The output from this receiver comprises video signals which are fed through a slip ring unit 18 to the grid to cathode circuit of a cathode ray tube 19 to produce brightness modulation of the contrast on the screen. The beam of the cathode ray tube is deflected by means of a fixed deflector coil system represented diagrammatically by fixed coils 20 fed from a scanning signal generator 21. The deflector coil system may comprise, in the known manner, separate deflection coils for deflecting the cathode ray beam in two directions at right angles, which coils are fed with scanning currents having saw-tooth waveforms, the instantaneous amplitudes of the currents in the two coils being proportional to the sine and cosine of an angle corresponding to the angular position of the antenna 13. For this purpose, the timing of the scanning waveforms are controlled from the trigger pulse generator 11 and their amplitudes are controlled in accordance with the rotation of the antenna 13 by means of an angular bearing data transmitter represented diagrammatically at 22.

The cathode ray tube 19 is carried in a holder 24 rotatably mounted in a display unit 25 and the holder 24 is rotated by means of an electric motor 26 through gearing 27. This motor 26 is controlled from a compass 28 by means of a compass repeater drive system 29 so that the tube is rotated in accordance with the changes in the heading of the vehicle on which the radar apparatus is installed. This rotation of the tube is in the direction to compensate for changes in the relative bearings of the radar targets so that echoes of targets tend to remain in the same position on the actual screen of the tube apart from any changes due to the motion of the targets or the motion of the ship carrying the radar. Since the cathode ray tube is rotated, its power supplies are fed through the slip ring unit 18 from their sources which are indicated diagrammatically at 30.

For the purpose of the present invention there are provided fixed off-centering coils 32, 33 for off-centering the display on the screen. The ship's position on the display is to be displaced, at all times, from the centre of the screen by an amount and in a direction corresponding to the relative position of the ship with respect to a chart position corresponding to the centre of the screen but the display must always be oriented so that the ship's heading corresponds to a fixed direction on the display. Thus, for example, if the ship's position on the screen (assuming the screen is in a vertical plane) is vertically above the centre of the screen, then if the ship turns through 90° to starboard, the off-centering of the display on the screen must then be turned through 90° in an anti-clockwise direction so that the ship's position will be due left of the centre of the screen. Referring to FIGURE 1, a speed measuring device 34 feeds a signal representative of the speed of the ship to a resolver 35 which resolves the signal into two components representative of the speed in two predetermined compass directions, e.g. North-South and East-West, this resolution being effected by controlling the resolver from the output of the compass repeater drive unit 29. The two outputs from the resolver 35 are fed respectively to integrators 36, 37 which may each comprise a motor-driven potentiometer, to produce outputs representative respectively of the cumulative components of movement in said two predetermined directions. These two cumulative components are then combined and resolved, in units 38, 39, into components in the two directions, e.g. fore and aft and athwartships, of deflection of the coil systems 32, 33 to provide the deflection currents to be fed to these coil systems. For a further description of one embodiment of apparatus suitable for controlling currents in accordance with the speed and direction of movement of a ship, reference may be had to copending British patent application No. 35043/55.

Although in FIGURE 1, it has been assumed that the coil system 20 and the coil system 32, 33 each have coils providing deflections in two orthogonal directions so that two inputs to each system are required, other types of deflection coil systems may be used. For example, either the scanning deflection coils 20 and/or the off-centering coils 32, 33 might consist of three coils or three pairs of coils arranged with their axes mutually inclined at 120° in a plane orthogonal to the axis of the cathode ray tube and it will be obvious to those skilled in the art as to how the requisite deflection currents may be obtained for such coil systems. Furthermore, the off-centering coils, whether or not they are similar to the scanning coils, may be interwound with the latter.

Instead of having separate off-centering and scanning deflection coils, a single set of deflection coils might be employed, these being fed with combined scanning and off-centering signals as, for instance, in the manner described in British patent specification No. 737,519.

FIGURE 2 illustrates another embodiment of the invention. The pulse radar system shown in FIGURE 2 is, in many features, similar to that of FIGURE 1 and the same reference characters will be used to indicate corresponding parts. The arrangement of FIGURE 2 includes a transmitter 10, a trigger pulse generator 11, duplexer 12 and antenna 13 and a radar receiver 17 as in the arrangement of FIGURE 1. In the arrangement of FIGURE 2 however, a cathode ray tube 50 is fixedly mounted in a frame 51 which is rotatable in the display unit casing 52. The frame 51 is rotatably driven through gears 53 by means of a motor 54 from a compass repeater drive system 29 similar to that employed in the arrangement of FIGURE 1. In the arrangement of FIGURE 2 the scanning deflector coils 55 are fixed with respect to the frame 51 and are fed, through a slip ring unit 18, with the outputs from a scanning wave form generator 57. In this arrangement the scanning waveforms must have amplitudes representative of the sine and cosine of an angle which is determined by the combination of the compass bearing of the vehicle and the relative bearing of the radar antenna with respect to the vehicle. The waveform generator 57 is therefore controlled by an azimuth stabiliser 58 fed from the compass repeater drive system 29 and from the angular bearing data transmitter 22 which transmits the data regarding the angular position of the antenna 13 with respect to the vehicle.

In the arrangement of FIGURE 2, off-centering coils 40, 41 are mounted in the frame 51 to be rotated therewith, these coils being arranged to effect off-centering deflections in the two directions into which the resolver 35 resolves the output of the speed measurer 34 so that the outputs from the integrators 36, 37 may be fed directly to the coils 40, 41 through the slip ring unit 18. This arrangement employing rotatable off-centering coils thus greatly simplifies the provision of the necessary off-centering signals. It will be appreciated that the rotatable off-centering coils of FIGURE 2 might be used with the fixed scanning coils of FIGURE 1 or conversely the fixed off-centering coils of FIGURE 1 could be used not only with fixed scanning coils as in FIGURE 1 but also with the rotatable scannning coils of FIGURE 2.

In a system, such as that of FIGURE 2, in which the scanning coils are mounted in the rotatable frame 51, a switch 42 may be provided in the circuit to the motor 54. If the switch 42 is opened to cut off the supply to the motor 54, then the display on the tube 50 will become an azimuth stabilised display instead of a relative display. In addition switches 43 are provided in the supply leads to the off-centering coils so that if desired the display may be converted into a normal type of display with the position of the ship at a fixed point on the screen, the display being a relative or an azimuth stabilised display according to whether the switch 42 is closed or open.

If, as in FIGURE 2, both the off-centering and the scanning coils are rotatable with the cathode ray tube, the coils may be interwound or only a single set of deflection coils used by arranging that the coils are fed with combined scanning and off-centering signals.

The arrangement of FIGURE 3 is generally similar to that of FIGURE 2 and the same reference numerals are employed to indicate corresponding parts. The main distinction between the two arrangements is that, in FIGURE 3, instead of having scanning coils 55 which are fixed in the rotatable frame 51, for the cathode ray tube, there is provided a deflection coil holder 60 which is rotated around the neck of the cathode ray tube 50 by means of a motor 61 which motor is controlled, by the azimuth stabiliser 58 in accordance with both the compass bearing and the relative bearing of the radar antenna with respect to the vehicle, so as to scan the cathode ray beam in the appropriate manner. The motor 61 and the deflection coil holder 60 are mounted in the frame 51 so as to be rotated therewith with the tube by means of the motor 54. In FIGURE 3, as in FIGURE 2, the off-centering coils 40, 41 are mounted in the rotatable frame 51 so as to be rotated therewith and are fed from the integrators 36, 37 through the slip ring unit 18. Switches 42, 43 are provided, as in FIGURE 2, to enable the display to be converted into an azimuth stabilised display, with or without off-centering, if desired.

In FIGURE 4, the same reference characters are used as in FIGURE 3 to denote corresponding components. The arrangement of FIGURE 4 differs from FIGURE 3 in that the scanning deflection is effected by means of a rotatable deflection coil 70 mounted on a holder 71 for rotation about the neck of the cathode ray tube 30 by means of a motor 72. This motor is fixed, unlike the motor 61 of FIGURE 3 which is carried in the frame 51, and the motor 72 can then be controlled directly from the bearing data transmitter 22. Although this arrangement for effecting the scanning of the cathode ray beam is simpler than that of FIGURE 3, it will be appreciated that there is, with FIGURE 4, no possibility of converting the display into an azimuth stabilised display merely by switching off the motor 26. In the arrangement of FIGURE 4, the off-centering is effected in a similar way to that employed in FIGURE 1, the off-centering coils 32, 33 being fixed and fed from the combining and resolving units 38, 39. Instead of having fixed off-centering coils 32, 33, there might alternatively be employed in the arrangement of FIGURE 4, rotatable off-centering coils similar to the coils 40, 41 of FIGURES 2 and 3, which coils would be fed in a similar manner to that employed in these two figures.

It will be seen that, in the arrangements of each of FIGURES 1, 2, 3 and 4, there is provided a relative display on the screen of the cathode ray tube but the cathode ray tube is rotated so as to prevent any smudging of echo responses due to yawing or turning of the ship and the radar picture on the screen of the tube is displaced at a rate and in a direction to prevent any smudging of echo responses due to the movement of the ship.

Although in each of FIGURES 1 to 4, provision is made for automatically controlling the off-centering of the display, for some purposes, it may be sufficient to provide a manual control which can be set, according to the speed of the ship, to effect a steady change in the off-centering as the ship travels on a straight course. Since, in that case, the off-centering is always in the direction of the ship's heading, which is a fixed direction on the screen in a relatiive display, this may be achieved very simply by providing a single fixed deflection coil system, a variable current generator for feeding the deflection coil comprising a motor driven potentiometer and a manual control for adjusting the speed of the motor.

It is sometimes desirable to have a transparent plotting surface over the face of the cathode ray tube. In FIGURE 1 there is shown such a plotting surface 80 which is secured to the cathode ray tube holder 24 so as to be rotated with the tube 19. In some cases, however, it may be undesirable to have a moving surface for plotting and there is shown, in FIGURES 2, 3 and 4, a plotting surface 81 which is rotatably mounted on the display unit 52 in front of the screen of the tube 50. This plotting surface can be manually rotated and is provided with a fixed mark such as a North mark so that it can be rotated manually to be in line with the corresponding mark on the cathode ray tube. This latter mark is most conveniently provided by a bearing scale 82 carried on the frame 51. As previously explained this frame 51 is rotated by the motor 54 controlled from the compass repeater drive 29 so that the bearing scale 82 will always be in the correct position with respect to the display on the screen of the tube 50. It will be understood, of course, that a manually rotatable plotting surface such as the surface 81 may be used in the arrangement of FIGURE 1 and that an automatically rotating plotting surface such as the surface 80 may be used in the arrangement of FIGURES 2, 3, and 4. If the ship only operates in a limited area, the plotting surface is conveniently a chart transparency.

We claim:

1. In radar apparatus for use on a vehicle and having a cathode ray display tube with means for providing a relative plan position display, the combination of compass-controlled means for rotating the tube in accordance with changes in the heading of the vehicle to stabilize in azimuth the screen of the tube so that echoes of targets tend to remain in the same angular position on the actual screen of the tube and off-centering means controlled in accordance with the rate and direction of movement of the vehicle for off-centering the display on the screen of the tube at a rate and in a direction corresponding to the movement of the vehicle.

2. In radar apparatus for use on a vehicle and having a cathode ray display tube with means for providing a relative plan position display, the combination of compass-controlled means for rotating the tube about its axis in accordance with changes in the heading of the vehicle to stabilize in azimuth the screen of the tube so that echoes of targets tend to remain in the same angular position on the screen of the tube, an off-centering coil system having fixed deflector coils for effecting deflection of the cathode ray beam magnetically and means for feeding, to said fixed deflector coils, off-centering control currents controlled to vary in accordance with changes in the cumulative movement of the vehicle.

3. The combination as claimed in claim 2 wherein said fixed deflector coils comprise two orthogonal deflector coil systems and wherein the means for feeding currents to said deflector coils include manual adjusting means for adjusting the rates of change and the ratio of the rates of change of currents in the two orthogonal deflector coil systems according to the speed and direction of movement of the vehicle.

4. The combination as claimed in claim 2 wherein said fixed deflector coils comprise two orthogonal deflector coil systems and wherein the means for feeding currents to said deflector coils include a speed measuring device for measuring the speed of the vehicle, a compass, and current generators controlled by said speed measuring device and compass for feeding to said two orthogonal deflector coil systems currents varying in accordance with the respective components in two directions at right angles to one another and fixed with respect to the heading of the vehicle of the cumulative changes in the position of the vehicle.

5. The combination as claimed in claim 2 wherein said fixed deflector coils comprise two orthogonal deflector coil systems and wherein the means for feeding currents to said deflector coils include a speed signal generator arranged to produce a signal proportional to the speed of the vehicle, a resolver controlled by said compass to resolve the signal from said speed signal generator into two components corresponding to the components of speed of the vehicle in two fixed compass directions at right angles, a pair of integrators arranged respectively to integrate the two resolved components of the signal, resolving and combining means controlled by said compass for resolving each of the two integrated signal components into components in two directions at right angles to one another which are fixed with respect to the heading of the vehicle and for combining the corresponding components in these two directions respectively to produce two combined output currents varying in accordance with the cumulative changes in the position of the vehicle in two orthogonal directions fixed with respect to the heading of the vehicle, and means for feeding the two combined output currents respectively to said two orthogonal deflector coil systems.

6. In radar apparatus for use on a vehicle and having a cathode ray display tube with means for providing a relative plan position display, the combination of compass-controlled means for rotating the tube about its axis in accordance with changes in the heading of the vehicle to stabilize in azimuth the screen of the tube so that echoes of targets tend to remain in the same angular position on the screen of the tube, an off-centering coil system mounted for rotation about the axis of said cathode ray tube, means for rotating said coil system with said tube, and means for feeding, to said off-centering coil system, off-centering control currents controlled to vary in accordance with changes in the cumulative movement of the vehicle.

7. The combination as claimed in claim 6, wherein said off-centering coil system comprises two orthogonal deflector coil systems and wherein the means for feeding currents to said deflector coil systems include manual adjusting means for adjusting the currents in the two orthogonal deflector coil systems according to the components in two directions at right angles of the cumulative change in position of the vehicle.

8. The combination as claimed in claim 6 wherein said off-centering coil system comprises two orthogonal deflector coil systems and wherein said means for feeding currents to said off-centering coil system include a speed measuring device for measuring the speed of the vehicle, a compass, and current generators controlled by said speed measuring device and compass for feeding to said two orthogonal deflector coil systems currents varying according to the components in two directions at right angles of the cumulative changes in the position of the vehicle.

9. The combination as claimed in claim 6 wherein said off-centering coil system comprises two orthogonal deflector coil systems and wherein said means for feeding currents to said off-centering coil system include a speed signal generator arranged to produce a signal proportional to the speed of the vehicle, a resolver controlled by said compass to resolve the signal from said speed signal generator into two components corresponding to the components of speed of the vehicle in the two directions, a pair of integrators arranged respectively to integrate the two resolved components of the signal, and means coupling the two integrators respectively to the two orthogonal deflector coil systems to feed the integrated signal components to said orthogonal deflector coil systems.

10. In radar apparatus for use on a vehicle and having a cathode ray display tube with means for providing a relative plan position display, the combination of compass-controlled means for rotating the tube in accordance with changes in the heading of the vehicle to stabilize in azimuth the screen of the tube so that echoes of the targets tend to remain in the same angular position on the actual screen of the tube, off-centering means controlled in accordance with the rate and direction of movement of the vehicle for off-centering the display on the screen of the tube at a rate and in a direction corresponding to the movement of the vehicle, and a transparent plotting surface rotatably mounted over the screen of the cathode ray tube for rotation about the axis of rotation of the tube.

11. The combination as claimed in claim 10 wherein means are provided for driving said plotting surface to rotate automatically in synchronism with the rotation of the tube.

12. The combination as claimed in claim 10 wherein the plotting surface is mounted freely for manual rotation about the axis of rotation of the tube.

13. In radar apparatus for use on a vehicle and having a cathode ray tube mounted in a housing with means for providing, on the screen of the tube, a plan position radar display in which the direction of the heading of the vehicle remains in a constant direction with respect to said housing, the combination of a compass, means controlled by said compass for rotating the tube about its axis in said housing in accordance with changes in the heading of the vehicle to stabilize in azimuth the screen of the tube so that echoes of targets tend to remain in the same angular position on the actual screen of the tube, and off-centering means controlled in accordance with the rate and direction of movement of the vehicle for off-centering the display on the screen of the tube at a rate and in a direction corresponding to the movement of the vehicle.

14. In radar apparatus for use on a vehicle and having a cathode ray tube mounted in a housing with means for providing, on the screen of the tube, a plan position radar display in which the direction of the heading of the vehicle remains in a constant direction with respect to said housing, the combination of a compass, means controlled by said compass for rotating the tube about its axis in said housing in accordance with changes in the heading of the vehicle to stabilize in azimuth the screen of the tube so that echoes of targets tend to remain in the same angular position on the actual screen of the tube, a speed signal generator arranged to produce an electrical current representative of the speed of the vehicle, a resolver controlled by said compass for resolving the output of the speed signal generator into components in two pre-determined orthogonal compass directions, a pair of integrators arranged respectively to integrate the two component outputs of the resolver, an off-centering deflection coil system for effecting off-centering deflection of the beam of said cathode ray tube, and means coupling said integrators to said off-centering deflection coil system to feed to the deflection coil system deflection currents for off-centering the display on the screen of the tube at a rate and in a direction corresponding to the movement of the vehicle.

15. In radar apparatus for use on a vehicle and having a transmitter, a receiver and a continuously rotatable directional scanning antenna system for radiating signals from the transmitter and for feeding return echo signals to the receiver; a plan position display apparatus comprising a cathode ray tube having a screen across which the cathode ray beam can be scanned, a housing in which the cathode ray tube is rotatably mounted for rotation about the axis of the tube, means coupling the receiver to the tube for effecting brightness modulation of the cathode ray beam in accordance with signals received by said receiver, scanning deflection coils for said cathode ray tube fixed with respect to said housing, scanning signal generator means coupled to said scanning deflection coils and controlled in synchronism with the antenna system to effect repetitive radial scanning deflection of the cathode ray beam across said screen in a direction rotating in accordance with the relative direction of the antenna system with respect to the heading of the vehicle, a compass, means controlled by said compass for rotating said cathode ray tube about its axis in accordance with changes of the heading of the vehicle to stabilize the screen of the tube in azimuth so that echoes of targets tend to remain in the same angular position on the actual screen of the cathode ray tube, two off-centering deflection coils for said cathode ray tube fixed with respect to said housing for effecting off-centering deflection of the cathode ray beam respectively in two orthogonal directions, a speed signal generator arranged to produce a signal proportional to the speed of the vehicle, a resolver controlled by said compass to resolve the signal from said speed signal generator into two components corresponding to the components of the speed of the vehicle in two fixed compass directions at right angles, a pair of integrators arranged respectively to integrate the two resolved components of the signal, resolving and combining means controlled by said compass for resolving each of the two integrated signal components into components in two directions at right angles to one another which are fixed with respect to the heading of the vehicle and for combining the corresponding components in these two directions respectively to produce two combined output currents varying in accordance with the cumulative changes in the position of the vehicle in these two orthogonal directions fixed with respect to the heading of the vehicle, and means for feeding the two combined output currents respectively to the two off-centering deflection coils.

16. In radar apparatus for use on a vehicle and having a transmitter, a receiver and a continuously rotatable directional scanning antenna system for radiating signals from the transmitter and for feeding returned echo signals to the receiver; a plan position display apparatus comprising a cathode ray tube having a screen across which the cathode ray beam can be scanned, a housing in which the cathode ray tube is rotatably mounted for rotation about the axis of the tube, means coupling the receiver to the tube for effecting brightness modulation of the cathode ray beam in accordance with signals received by said receiver, scanning deflection coils for said cathode ray tube mounted to rotate with said tube, a compass, an azimuth stabilizer controlled by said compass and said antenna system to provide an output representative of the compass bearing of the antenna system, scanning signal generator means coupled to said scanning deflection coils and controlled by said azimuth stabilizer to effect repetitive radial scanning deflection of the cathode ray beam across said screen in a direction rotating relative to the screen of the tube in accordance with the compass direction of the antenna system, means controlled by said compass for rotating said cathode ray tube about its axis in the housing in accordance with changes of the heading of the vehicle to stabilize the screen of the tube in azimuth so that echoes of targets are displayed on the screen of the tube in positions with respect to the housing corresponding to the relative bearings of the targets with respect to the heading of the vehicle, two off-centering deflection coils for said cahtode ray tube mounted to rotate with the tube for effecting off-centering deflection of the cathode ray beam in two orthogonal directions, a speed signal generator arranged to produce a signal proportional to the speed of the vehicle, a resolver controlled by said compass to resolve the signal from said speed signal generator into two components in fixed compass directions corresponding to the components of speed of the vehicle in the two directions, a pair of integrators arranged respectively to integrate the two resolved components of the signal, and means coupling the two integrators respectively to said two off-centering deflection coils to effect off-centering deflection of the cathode ray beam.

17. Apparatus as claimed in claim 16 wherein means are provided operative simultaneously to interrupt the drive for rotating the cathode ray tube in its housing and to disconnect the feeds to said off-centering deflection coils.

18. In radar apparatus for use on a vehicle and having a transmitter, a receiver and a continuously rotatable directional scanning antenna system for radiating signals from the transmitter and for feeding returned echo signals to the receiver; a plan position display apparatus comprising a cathode ray tube having a screen across which cathode ray beam can be scanned, a housing in which the cathode ray tube is rotatably mounted for rotation about the axis of the tube, means coupling the receiver to the tube for effecting brightness modulation of the cathode ray beam in accordance with signals received by said receiver, a scanning deflection coil system for said cathode ray tube mounted to rotate about the axis of said tube for effecting radial deflection of the cathode ray beam, a compass, an azimuth stabilizer controlled by said compass and said antenna system to provide an output representative of the compass bearing of the antenna system, a scanning signal generator coupled to said scanning deflection coil system, drive means for said scanning deflection coil system controlled by said azimuth stabilizer to rotate said scanning deflection coil system with respect to said tube in accordance with the compass direction of the antenna system, means controlled by said compass for rotating said cathode ray tube about its axis in the housing in accordance with changes of the heading of the vehicle to stabilize the screen of the tube in azimuth so that echoes of targets are displayed on the screen of the tube in positions with respect to the housing corresponding to the relative bearings of the targets with respect to the heading of the vehicle, two off-centering deflection coils for said cathode ray tube mounted to rotate with the tube for effecting off-centering deflection of the cathode ray beam in two orthogonal directions, a speed signal generator arranged to produce a signal proportional to the speed of the vehicle, a resolver controlled by said compass to resolve the signal from said speed signal generator into two components in fixed compass directions corresponding to the components of speed of the vehicle in the two directions, a pair of integrators arranged respectively to integrate the two resolved components of the signal, and means coupling the two integrators respectively to said two off-centering deflection coils to effect off-centering deflection of the cathode ray beam.

19. Apparatus as claimed in claim 18 wherein means are provided operative simultaneously to interrupt the drive for rotating the cathode ray tube in its housing and to disconnect the feeds to said off-centering deflection coils.

20. In radar apparatus for use in a vehicle and having a transmitter, a receiver and a continuously rotatable directional scanning antenna system for radiating signals from the transmitter and for feeding returned echo signals to the receiver; a plan position display apparatus comprising a cathode ray tube having a screen across which the cathode ray beam can be scanned, a housing in which the cathode ray tube is rotatably mounted for rotation about the axis of the tube means coupling the receiver to the tube for effecting brightness modulation of the cathode ray beam in accordance with signals received by said receiver, a scanning deflection coil system for said cathode rotatably mounted in said housing for effecting radial deflection of the cathode ray beam, a scanning signal generator coupled to said scanning deflection coil system drive means for rotating said scanning deflection coil system in synchronism with the rotation of the antenna system with respect to the vehicle, a compass, means controlled by said compass for rotating said cathode ray tube about its axis in accordance with changes of the heading of the vehicle to stabilize the screen of the tube in azimuth so that echoes of targets tend to remain in the same angular position on the actual screen of the cathode ray tube, two off-centering deflection coils for said cathode ray tube fixed with respect to said housing for effecting off-centering deflection of the cathode ray beam respectively in two orthogonal directions, a speed signal generator arranged to produce a signal proportional to the speed of the vehicle, a resolver controlled by said compass to resolve the signal from said speed signal generator into two components corresponding to the components of the speed of the vehicle in two fixed compass directions at right angles, a pair of integrators arranged respectively to integrate the two resolved components of the signal, resolving and combining means controlled by said compass for resolving each of the two integrated signal components into components in two directions at right angles to one another which are fixed with respect to the heading of the vehicle and for combining the corresponding components in these two directions respectively to produce two combined output currents varying in accordance with the cumulative changes in the position of the vehicle in these two orthogonal directions fixed with respect to the heading of the vehicle, and means for feeding the two combined output currents respectively to the two off-centering deflection coils.

References Cited in the file of this patent

UNITED STATES PATENTS

| | | |
|---|---|---|
| 2,209,191 | Dearing | July 23, 1940 |
| 2,573,021 | Higinbotham | Oct. 30, 1951 |
| 2,589,584 | Thompson | Mar. 18, 1952 |
| 2,688,130 | Whitaker | Aug. 31, 1954 |
| 2,697,827 | Whitaker | Dec. 21, 1954 |
| 2,701,352 | Kingdon | Feb. 1, 1955 |
| 2,742,637 | Braddon | Apr. 17, 1956 |